US008744026B2

(12) United States Patent
Rosenqvist et al.

(10) Patent No.: US 8,744,026 B2
(45) Date of Patent: Jun. 3, 2014

(54) METHOD AND APPARATUS FOR INTERFERENCE SUPPRESSION USING A REDUCED-COMPLEXITY JOINT DETECTION

(75) Inventors: Anders Rosenqvist, Lund (SE); Niklas Andgart, Södra Sandby (SE); Bo Bernhardsson, Lund (SE)

(73) Assignee: Telefonakktiebolaget LM Ericsson (Publ), Stockholm (SE)

( * ) Notice: Subject to any disclaimer, the term of this patent is extended or adjusted under 35 U.S.C. 154(b) by 786 days.

(21) Appl. No.: 12/903,836

(22) Filed: Oct. 13, 2010

(65) Prior Publication Data

US 2012/0093263 A1    Apr. 19, 2012

(51) Int. Cl.
*H04B 1/10* (2006.01)
(52) U.S. Cl.
USPC ........... 375/350; 375/260; 375/285; 375/346; 375/347; 375/349
(58) Field of Classification Search
USPC ......... 375/130, 140–153, 229–236, 259–285, 375/316–352
See application file for complete search history.

(56) References Cited

U.S. PATENT DOCUMENTS

| | | | | |
|---|---|---|---|---|
| 5,499,399 | A * | 3/1996 | Bond et al. | 455/296 |
| 5,517,531 | A * | 5/1996 | Bond et al. | 375/350 |
| 5,544,199 | A * | 8/1996 | Bond | 375/285 |
| 6,466,566 | B1 | 10/2002 | De Gaudenzi et al. | |
| 6,925,127 | B1 * | 8/2005 | Dent | 375/260 |
| 7,355,958 | B2 | 4/2008 | Chen | |
| 7,372,802 | B2 * | 5/2008 | Breiling et al. | 370/206 |
| 7,496,164 | B1 | 2/2009 | Mostafa | |
| 7,706,488 | B2 * | 4/2010 | Chen et al. | 375/354 |
| 7,995,973 | B2 * | 8/2011 | Dent et al. | 455/87 |
| 8,090,320 | B2 * | 1/2012 | Dent et al. | 455/63.1 |

(Continued)

FOREIGN PATENT DOCUMENTS

| | | |
|---|---|---|
| JP | 2009111982 S | 5/2009 |
| WO | 2006/130502 A2 | 12/2006 |
| WO | 2009/061253 A1 | 5/2009 |
| WO | 2009/112435 A1 | 9/2009 |

OTHER PUBLICATIONS

Al-Rawi, G. A. et al. "Exploiting Error-Control Coding and Cyclic-Prefix in Channel Estimation for Coded OFDM Systems." IEEE Communications Letters, vol. 7, No. 7, Jul. 2003, pp. 388-390.

(Continued)

*Primary Examiner* — Sam K Ahn
*Assistant Examiner* — James M Perez
(74) *Attorney, Agent, or Firm* — Coats and Bennett, P.L.L.C.

(57) ABSTRACT

A method of detecting a desired signal within a composite signal provides for suppression of interfering signal(s). The method, implemented in a wireless communication apparatus, for example, includes receiving the composite signal and obtaining sample values therefrom. At least some of the sample values include desired and interfering signal components. The method further includes generating an interfering signal channel estimate by: forming sample pairs for some or all of the sample values; identifying sample pairs of interest as those sample pairs in which the interfering signal component is the same; and calculating the interfering signal channel estimate as an average value determined from one or more of the sample pairs of interest. The method further includes detecting desired signal symbols from the composite signal in a joint detection process that functionally depends on the interfering signal channel estimate.

14 Claims, 9 Drawing Sheets

(56) References Cited

U.S. PATENT DOCUMENTS

| | | | |
|---|---|---|---|
| 2004/0076112 A1 | 4/2004 | Chen | |
| 2004/0208269 A1* | 10/2004 | Chen et al. | 375/354 |
| 2005/0111347 A1* | 5/2005 | Breiling et al. | 370/206 |
| 2005/0276340 A1 | 12/2005 | Chow et al. | |
| 2006/0188031 A1* | 8/2006 | Liu | 375/260 |
| 2007/0127608 A1 | 6/2007 | Scheim et al. | |
| 2007/0129042 A1 | 6/2007 | Kristensson et al. | |
| 2007/0263744 A1 | 11/2007 | Mostafa | |
| 2009/0016465 A1* | 1/2009 | Ramesh | 375/324 |
| 2009/0154620 A1 | 6/2009 | Mostafa | |
| 2010/0067366 A1* | 3/2010 | Nicoli | 370/210 |
| 2010/0159837 A1* | 6/2010 | Dent et al. | 455/63.1 |
| 2010/0159858 A1* | 6/2010 | Dent et al. | 455/131 |

OTHER PUBLICATIONS

Chen, B. et al. "Blind Estimation of OFDM Carrier Frequency Offset via Oversampling." IEEE Transactions on Signal Processing, vol. 52, No. 7, Jul. 2004, pp. 2047-2057.

Chien, F.-T. et al. "Joint Symbol Detection and Channel Estimation for MC-CDMA Systems in the Presence of Carrier Frequency Offset." 2004 IEEE 60th Vehicular Technology Conference (VTC 2004), vol. 1, Sep. 26-29, 2004, pp. 430-434.

Jeremic, A. et al. "OFDM Channel Estimation in the Presence of Asynchronous Interference." 2003 IEEE International Conference on Acoustics, Speech, and Signal Processing, 2003 (ICASSP '03), vol. 4, Apr. 6-10, 2003.

Jeremic, A. et al. "OFDM Channel Estimation in the Presence of Interference." IEEE Transactions of Signal Processing, vol. 52, No. 12, Dec. 2004, pp. 3429-3439.

Li, Ch. et al. "Subspace-Based Blind Channel Estimation for OFDM by Exploiting Virtual Carriers." IEEE Transactions on Wireless Communications, vol. 2, No. 1, Jan. 2003, pp. 141-150.

Liu, Z. et al. "Decoding and Equalization of Unknown Multipath Channels Based on Block Precoding and Transmit-Antenna Diversity." Conference Record of the Thirty-Third Asilomar Conference on Signals, Systems, and Computers, vol. 2, 1999, pp. 1557-1561.

Lv, T. et al. "Joint Estimation of Symbol Timing and Carrier Frequency Offset of OFDM Signals Over Fast Time-Varying Multipath Channels." IEEE Transactions on Signal Processing, vol. 53, No. 12, Dec. 2005, pp. 4526-4535.

Michelusi, N. "Semi-Blind Channel Estimation for LTE DownLink." Technical University of Denmark, Master of Science thesis paper, Jun. 2009.

Tsouri, G. R. et al. "A Physical Transmission Security Layer for Wireless Multiple Access Communication Systems." EUSIPCO, Poznan 2007, pp. 688-692.

Yatawatta, S. et al. "Blind Channel Estimation in MIMO OFDM Systems." IEEE Global Telecommunications Conference, 2002 (GLOBECOM '02), vol. 1, Nov. 17-21, 2002, pp. 317-321.

Yatawatta, S. et al. "Blind Channel Estimation in MIMO OFDM Systems with Multiuser Interference." IEEE Transactions on Signal Processing. vol. 54, Issue 3, Mar. 2006, pp. 1054-1068.

Various Authors. EURASIP Journal on Applied Signal Processing 2002:12, 1303-1305, © 2002 Hindawi Publishing Corporation. Whole document, but see especially articles to Sun (pp. 1314-1324), Jeney (pp. 1401-1414), Liang (pp. 1427-1436), Rousseaux (pp. 1437-1447), Destro-Filho (pp. 1448-1459), and Erdogmus (pp. 1473-1484).

Heoher, Peter Adam et al., "Single-Antenna Co-Channel Interference Cancellation for TDMA Cellular Radio Systems", IEEE Wireless Communications, IEEE Service Center, Piscataway, NJ, US, vol. 12, nno. 2, Apr. 1, 2005, pp. 30-37.

Schoeneich, Hendrik et al., "Iterative semi-blind signle-antenna cochannel interference cancellation and tight lower bound for joint maximum-likelihood sequence estimation", Signal Processing, Elsevier Science Publishers B.V. Amsterdam, NL, vol. 84, No. 11, Nov. 1, 2004, pp. 1991-2004.

\* cited by examiner

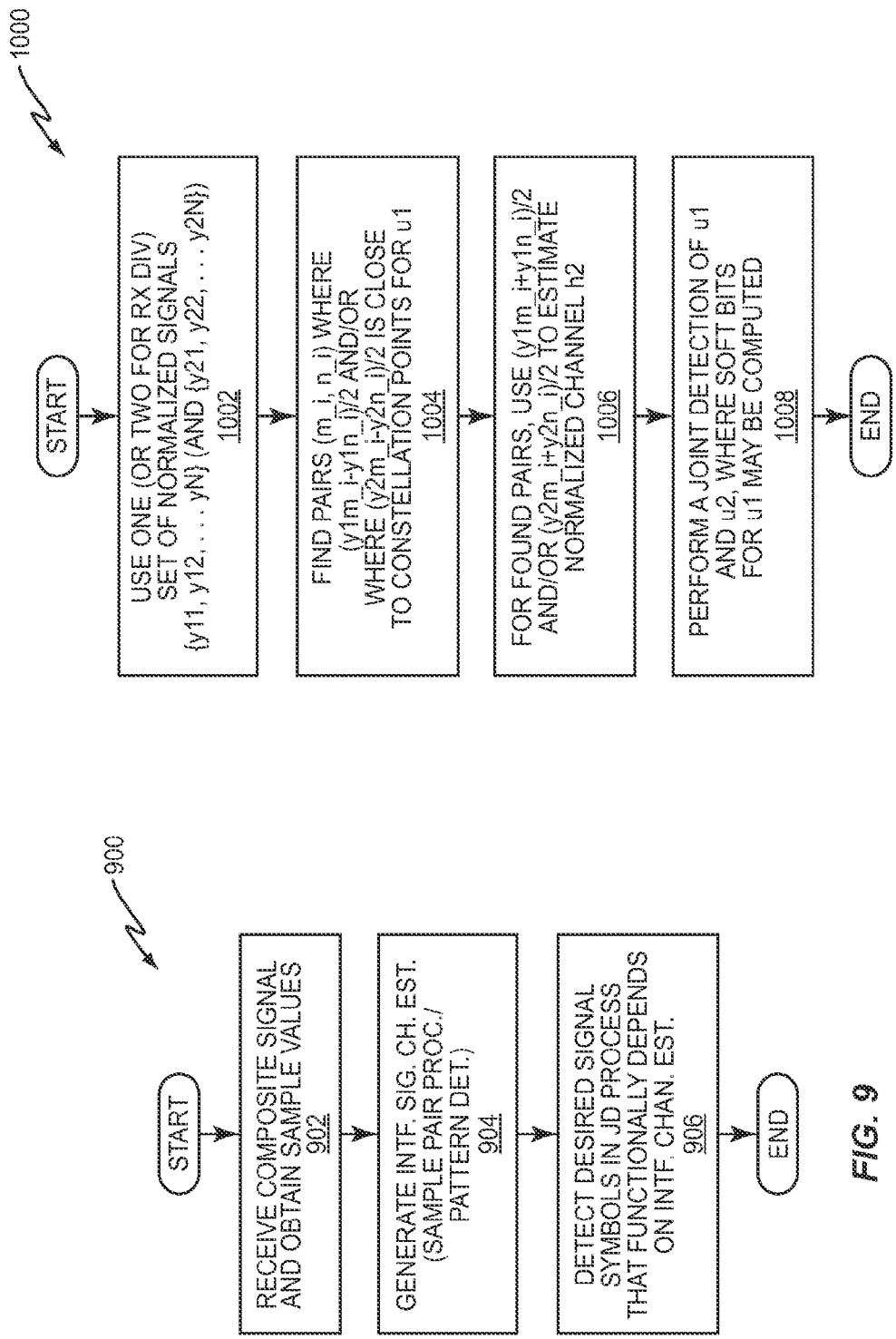

METHOD AND APPARATUS FOR INTERFERENCE SUPPRESSION USING A REDUCED-COMPLEXITY JOINT DETECTION

TECHNICAL FIELD

The present invention relates to interference suppression for received communication signals, and particularly relates to a method and apparatus for using a reduced-complexity joint detection for interference suppression.

BACKGROUND

Cellular communication receivers are subject to a range of interference. At cell borders, the main downlink (DL) interference is generated by neighboring cells. For LTE systems, the decoding performance for the control channel (QPSK coded) determines the limit at which a useful signaling connection can be maintained. It is therefore highly beneficial to improve the decoding performance of QPSK signals in the presence of one or several strong OFDM interferers.

There are several known techniques for attenuating neighbor cell interference. For example, some approaches use statistical properties of the residual noise, estimating its time, spectral and/or spatial characteristics, to determine the decoding parameters for the own cell signals. Items of user equipment (UEs) may be equipped with more than one receive (RX) antennas and can use multi-antenna reception to produce covariance estimates of noise and interference for use in interference suppression. Such methods can be viewed as a way of combining the RX antennas so that a suitable antenna beam pattern is formed for suppressing the direction of the strongest interferer. Such methods have the attraction of not requiring decoding of the interferer. However, relatively better performance can be achieved with more sophisticated schemes.

For example, higher performance may be obtained through use of one or more interference cancellation methods where the interfering signal is determined and subtracted from the received signal. Joint Detection (JD) processing represents one such approach. With JD processing, the symbols transmitted from the serving transmitter and the interfering transmitter are jointly determined. However, JD processing increases complexity because it relies on having significantly more "system" information available at the receiver. Such information generally must be available for all (cell) signals being jointly detected, such as channel estimates, modulation formats, pilot patterns, transmit diversity modes, etc. Furthermore, JD processing of one interfering signal, along with the desired signal, effectively doubles the channel estimation overhead and can easily more than double the overall decoding processing.

At the expense of further processing, JD processing can be combined with successive interference cancellation, often referred to as "SIC." A SIC receiver decodes the IQ symbols from an interfering signal and uses them to correct errors in the JD soft values. The true interferer is then re-generated and its impact on the received (RX) symbols is subtracted. This processing yields typically high performance, but obviously is even more costly than JD alone.

SUMMARY

In one example embodiment taught herein, a method of detecting a desired signal within a composite signal is performed in a wireless communication apparatus. The composite signal includes an interfering signal, and the method, which is referred to as half-blind joint detection (HB JD), provides for effective suppression of the interfering signal. One of several advantages offered by the HB JD processing taught herein is that, unlike "traditional" or full-complexity JD processing, HB JD processing does not require explicit, pilot-based estimation of the interfering signal channel.

Instead, the method includes receiving the composite signal and obtaining sample values therefrom, where at least some of the sample values include a desired signal component and an interfering signal component. The method further includes generating an interfering signal channel estimate by: forming sample pairs for some or all of the sample values; identifying sample pairs of interest as those sample pairs in which the interfering signal component is the same; and calculating the interfering signal channel estimate as an average value determined from one or more of the sample pairs of interest. Still further, the method includes detecting desired signal symbols from the composite signal in a joint detection process that functionally depends on the interfering signal channel estimate.

As such, the above-described method provides for a form of joint detection that does not require pilot or other reference symbol-based estimation of the interfering signal channel. In this and in other regards, the teachings presented herein provide a method and apparatus for reduced-complexity joint detection processing in a communication receiver. Such processing yields detection performance that approaches conventional joint detection described earlier herein, yet does not require explicit knowledge of the interfering signal.

In another example embodiment, a wireless communication apparatus is configured to detect a desired signal within a composite signal that includes an interfering signal. The apparatus includes a receiver configured to receive the composite signal and obtain sample values therefrom, where at least some of the sample values include a desired signal component and an interfering signal component. As an example, the apparatus comprises a communication device, such as a mobile terminal or other item of user equipment, and the receiver comprises a cellular communication receiver, such as one configured for operation in an LTE-based communication network.

The apparatus further includes a channel estimator configured to generate an interfering signal channel estimate, based on being configured to: form sample pairs for some or all of the sample values; identify sample pairs of interest as those sample pairs in which the interfering signal component is the same; and calculate the interfering signal channel estimate as an average sample value computed from one or more of the sample pairs of interest. As a non-limiting example, the receiver included within the apparatus has one or more processing circuits, such as a baseband digital signal processor implemented as one or more microprocessor circuits, DSPs, or other such digital processing circuitry. The processing circuit(s) comprise fixed (dedicated) hardware circuits, or programmable circuits, or a mix of both.

Additionally, the apparatus includes a joint detector—which may be implemented in the processing circuitry of the receiver. The joint detector is configured to detect desired signal symbols from the composite signal in a joint detection process that functionally depends on the interfering signal channel estimate. That is, the joint detection process implemented by the joint detector restricts or otherwise constrains its joint detection processing according to interfering signal channel estimates obtained from the channel estimator.

Of course, the present invention is not limited to the foregoing brief summary of features and advantages. Those of

BRIEF DESCRIPTION OF THE DRAWINGS

FIGS. 9 and 10 are logic flow diagrams of HB JD processing methods.

DETAILED DESCRIPTION

Figure 1:
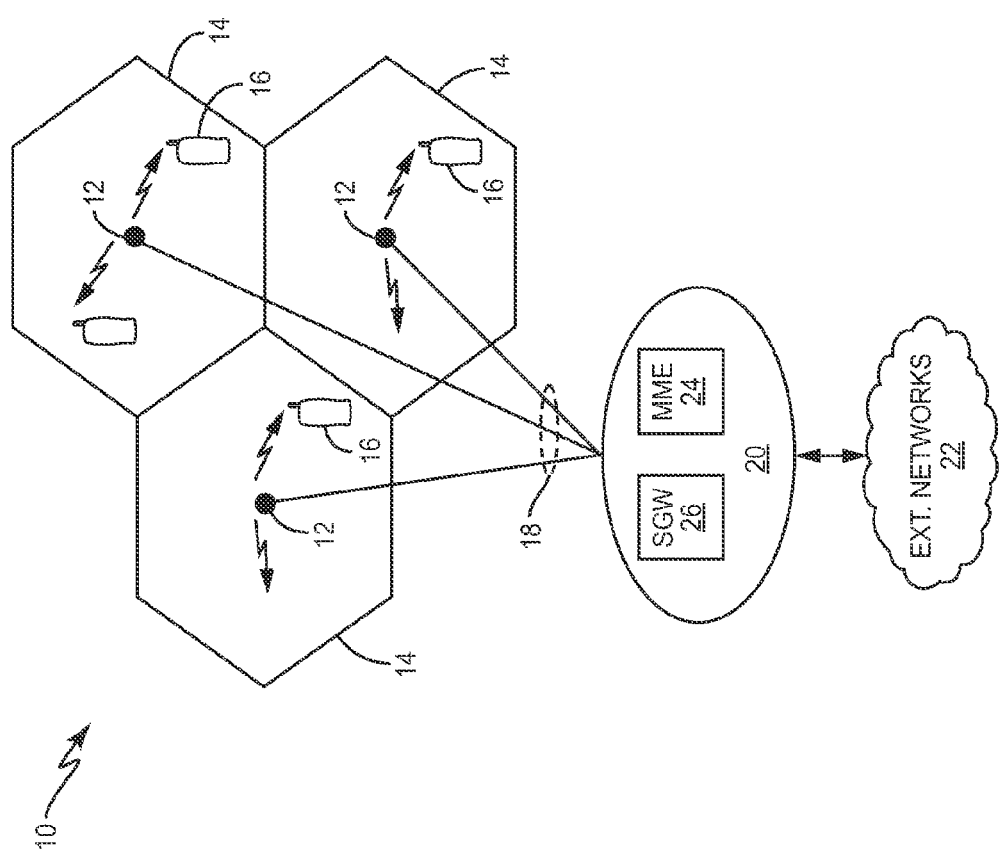
FIG. 1 is a block diagram of one embodiment of a wireless communication network.

FIG. 1 illustrates an example wireless communication network 10. Those of ordinary skill in the art will recognize that the illustration presents a simplified network depiction, for ease of discussion. With that point in mind, the network 10 includes a Radio Access Network (RAN) comprising a number of base stations 12, each providing radio service over a defined coverage area, referred to herein as a "cell" 14. The base stations 12 include wireless communication interfaces supporting wireless downlink/uplink signaling with pluralities of user equipments (UEs) 16, and further include additional wired and/or wireless communication interfaces supporting backhaul links 18 to a Core Network (CN) 20. In turn, the CN 20 communicatively interfaces to one or more external networks 22, such as the Internet.

As a non-limiting example, one or more of the UEs 16 are configured to implement HB JD processing as taught herein. To illustrate such processing, one may also assume, again as a non-limiting example, that the network 10 comprises an LTE network. In that context, the base stations 12 comprise eNodeBs, and the CN 20 includes, for example, a mobility management entity (MME) 24 for managing UE mobility among the cells 14 (there may be many such cells 14).

The CN 20 further includes a Serving Gateway (SGW) 26 that provides communicative coupling (packet routing, etc.) into and out of the network 10. The SGW 26 also acts as a mobility anchor in the user plane for UEs 16 undergoing inter-eNodeB handovers. On that point, those skilled in the art will recognize that one base station 12 may control one cell 14, or more than one cell 14. Further, the cells 14 may or may not be sectorized into distinct coverage areas, and they may be of varying sizes and may overlap with one another. Unless otherwise noted, such details are not germane to discussing the advantageously simplified joint detection processing at issue herein.

Indeed, in one or more example embodiments, what is germane is that a UE 16 receives a "serving" downlink signal from a given base station 12 (eNodeB 12, for this example). Here, "serving" simply denotes that data and/or control signaling targeted to the UE 16 is being transmitted by a particular one of the eNodeBs 12. The downlink signal(s) being transmitted from the eNodeBs 12 in one or more neighboring cells represent potentially significant interfering signals, depending on reception conditions and the UE's location within its serving cell 14. In certain cell areas, such as border areas, other-cell interference may be significant.

To that end, this disclosure teaches an advantageous method that performs a kind of simplified joint detection of two modulated signals—referred to herein as half-blind joint detection (HB JD). The disclosed HB JD processing is simplified in a number of respects. For example, it depends on selected observations of the interfering signal, as received at the UE 16, where that interfering signal is understood to represent a function of the transmitted interfering symbols and the propagation channel associated with the interfering transmitter. In this regard, the method does not require the UE 16 to make explicit, pilot-based channel estimations for the interfering signal, which would in turn require the UE 16 to have certain cellular system information for the neighboring cell(s) that are originating the interfering signal(s).

Consider the case where a UE 16 receives two modulated signals—e.g., a desired signal and an interfering signal—as a composite signal. The desired signal is a downlink signal from a serving cell 14, while the interfering signal is a downlink signal from a neighboring cell 14.

In this regard, it may be helpful to consider the downlink signal structure for the LTE example. The LTE standard defines a downlink physical layer signal based on Orthogonal Frequency Division Modulation (OFDM), using QPSK (Quadrature Phase Shift Keying), 16 QAM or 64 QAM (Quadrature Amplitude Modulation). The downlink OFDM signal is an aggregation of multiple narrowband subcarriers. Each subcarrier serves as a Resource Element (RE) at each defined OFDM symbol time—i.e., each subcarrier can convey a data, control, or reference symbol at any given OFDM symbol time.

Further, twelve subcarriers define a Resource Block (RB), and a given eNodeB 12 schedules transmissions to its supported UEs 16 via the ongoing scheduling and allocation of RBs. Of further note, the LTE downlink protocol uses a 10 ms radio frame. In turn, each frame comprises 10 subframes of 1 msec each. Each subframe includes two slots of 0.5 ms each. Each slot can accommodate seven symbols.

As such, in a given slot or over a given number of slots, a UE 16 according to the LTE example will be understood to receive a composite signal that includes desired symbols from the UE's serving eNodeB 12 and interfering symbols from, e.g., a neighboring eNodeB 12. Depending on UE mobility and other channel-related variables, the interfering signal channel conditions will be the same over a given span of time and/or frequency, within some insignificant range of variation.

According to a conventional JD processing approach, the UE 16 would explicitly estimate the interfering signal channel using pilot symbols from the neighboring eNodeB 12, and then undertake full decoding of the interfering signal symbols in a joint process that also determines the desired signal symbols. Advantageously, the simplified (reduced-complexity) HB JD processing proposed herein works where only channel estimates for one of the signals—e.g., the desired signal—are known in advance (i.e., explicitly estimated from received pilots). The disclosed HB JD processing method significantly reduces JD processing complexity, while yielding performance that directly compares with conventional JD processing.

As an example, assume that the desired and interfering signals are of the QPSK type. As noted earlier herein, this case is applicable to the downlink control channel in LTE where reliable decoding of the control channel is necessary for the UE 16 to maintain a radio link with its serving eNodeB 12. Yet, however advantageous this case may be, it is not a limiting case. The teachings herein directly apply to other types of signals. Indeed, even if a QPSK signal model is used for implementation of HB JD processing and the actual interfering signal being suppressed violates that model, the method may still provide meaningful interference suppression.

Of course, given the underlying operation of suppressing interfering signal symbols from desired signal symbols, performance is highest for the case where downlink transmissions are synchronized between the serving and neighboring (interfering) cells 14. In such cases, the symbols transmitted by the two cells 14 change simultaneously.

A basic feature of the receiver processing contemplated herein as part of the HB JD method is configuring a receiver to search for and find certain patterns relating to the differences in received signals, and to exploit those patterns for estimation of the interfering signal channel without need for explicit estimation of the interfering signal channel based on the reception of reference symbols in the interfering signal. In particular, a receiver implementing HB JD processing is configured to carry out certain pair-wise processing of received signal samples, as a basis for implicitly estimating the interfering signal channel, based on processing selected ones of the sample pairs, to isolate observations of the interfering signal channel (which at any given symbol time is observed at the receiver as a product of the interfering signal channel $h_2$ and the interfering symbol $u_2$.)

Figure 2:
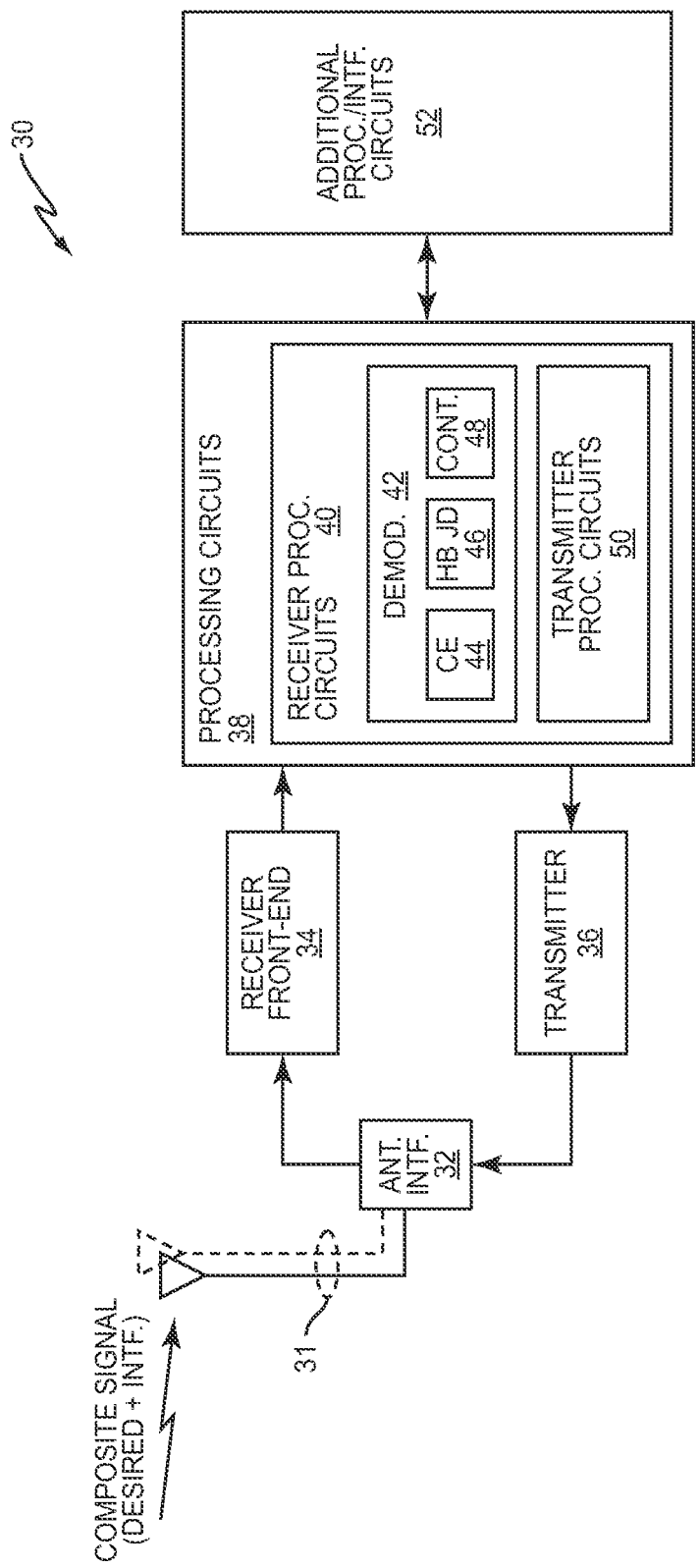
FIG. 2 is a block diagram of a wireless communication apparatus.

FIG. 2 provides non-limiting example details for a wireless communication apparatus 30, which may be, for example, any given one the UEs 16 introduced in the network 10 of FIG. 1. The apparatus 30 is configured to implement an embodiment of HB JD contemplated herein, which relies on the above noted pattern recognition and exploitation, for greatly simplified JD processing.

In particular, the apparatus 30 is configured to detect a desired signal within a composite signal that includes an interfering signal. The apparatus 30 includes one or more antennas 31, for receiving signals, e.g., a composite signal that includes a desired signal and an interfering signal. The apparatus 30 further includes an antenna interface 32, which couples the antenna(s) 31 to a receiver front-end 34 and to transmitter circuitry 36. The antenna interface 32 comprises, for example, coupling circuitry such as diplex and/or duplex filtering, and the receiver front-end 34 includes, for example, filtering, amplification, downconversion, and digitization circuitry. In this regard, the receiver front-end 34 will be understood to provide one or more streams of digital signal samples to the processing circuit(s) 38, corresponding to the antenna-received signals.

The receiver front-end 34 and receiver processing circuits 40 may be considered as a receiver that is configured to receive the composite signal and obtain sample values therefrom, where at least some of the sample values include a desired signal component and an interfering signal component. That is, it may be that interfering symbols are transmitted in some but not all symbol periods, so the received composite signal may or may not include interfering signal components in every symbol period.

In the illustrated arrangement, the receiver processing circuits 40 (which may comprise digital processing circuitry, such as a DSP or microprocessor configured via execution of stored computer program instructions) include a demodulator 42, which includes, among other functional processing elements, a channel estimator (CE) 44 and a half-blind joint detector (HD JB) 46, and may include an associated controller 48. (Note that the processing circuit(s) 38 also may include transmitter processing circuits 50, for providing outgoing transmit signaling to the transmitter circuitry 36, which will be understood to include modulation, amplification, and transmission circuitry. Further, the illustration also depicts additional processing and interface circuits 52, the implementation of which will depend on the features implemented by the apparatus 30 and the intended use of the apparatus 30.)

The channel estimator 44 is configured to generate an interfering signal channel estimate, based on being configured to: form sample pairs for some or all of the sample values (obtained from the received signal by the receiver); identify sample pairs of interest as those sample pairs in which the interfering signal component is the same (in terms of being the same transmitted signal value, e.g., the same transmitted value of interfering symbol); and calculate the interfering signal channel estimate as an average sample value computed from one or more of the sample pairs of interest. Correspondingly, the half-blind (HB) joint detector 46 is configured to detect desired signal symbols from the composite signal in a joint detection process that functionally depends on the interfering signal channel estimate, as provided by the channel estimator 44.

In one or more embodiments of the apparatus 30, the channel estimator 44 is configured do one of: calculate the interfering signal channel estimate as the average value of the signal samples in a selected sample pair of interest; or calculate the average value for each sample pair of interest in a set that includes some or all of the samples pairs of interest, phase-align the average values, and calculate the interfering signal channel estimate as the average of the phase-aligned average values. That is, each sample pair of interest includes a pair of sample values obtained for the received composite signal, and the interfering channel estimate, which generally is a complex value, is taken as the average of the sample values in a given sample pair of interest, or is taken as the average of multiple such averages (after phase-alignment, which is explained later herein).

In at least one embodiment of the apparatus 30, e.g., in an embodiment targeting QPSK signals, the half-blind joint detector 46 is configured to detect the desired signal symbols from the composite signal by taking sample values of the composite signal as received signal observations, and determining a best hypothesis for the desired signal symbol represented by each such observation. The joint detector 46 determines the best hypothesis for any given desired signal symbol, based on determining a candidate symbol value for the desired signal symbol and a candidate phase value for the interfering signal channel estimate that best accounts for the received signal observation.

The candidate symbol values are known from the defined modulation constellation points associated with modulation of the desired signal. Similarly, the candidate phase values for the interfering signal channel estimate are known from the defined modulation constellation points associated with modulation of the interfering signal. (These candidate phase values account for the "phase uncertainty" associated with HB JD as taught herein, which uses observations that are a function of the interfering signal and the interfering signal channel, such that the correct phase of the interfering signal channel estimate is the unknown phase of the interfering signal symbol associated with such observations. For the OFDM case, the observations represent the product of the interfering signal and the interfering channel.)

The sample values at issue in such processing correspond to desired signal symbols received within a certain span of time or frequency, or both. For example, the received composite signal comprises an OFDM signal and the receiver (front-end 34 and receiver processing circuits 40) comprises an OFDM receiver. With this example, the sample values comprise symbol samples taken at given symbol times, for given subcarriers.

Figure 3:
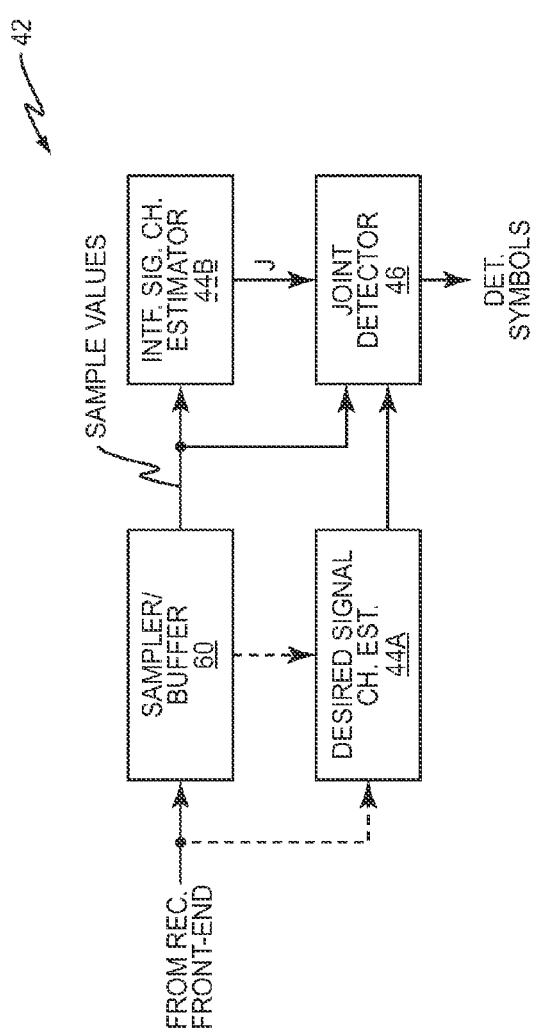
FIGS. 3 and 4 are block diagrams of example processing circuits for the wireless communication apparatus of FIG. 2.

FIG. 3 depicts an example arrangement of processing circuits which are, for example, functionally implemented within the demodulator 42. In this regard, FIG. 3 may be understood as a more detailed example of the demodulator 42.

According to the illustration, a sampler/buffer 60 temporarily buffers a set or window of received signal sample values for processing. Further, a desired signal channel estimator 44A generates the desired signal channel estimate using, e.g., pilot or other reference symbol information received in the desired signal, over the desired signal channel. On the other hand, the interfering signal channel estimator 44B estimates the interfering signal channel according to the teachings presented herein—i.e., pair-wise processing of the received signal samples, without need for explicit, pilot-based channel estimation. One sees the value "J" representing the interfering signal channel estimate fed into the HB joint detector 46, for joint detection processing to recover the desired signal symbols.

Figure 4:
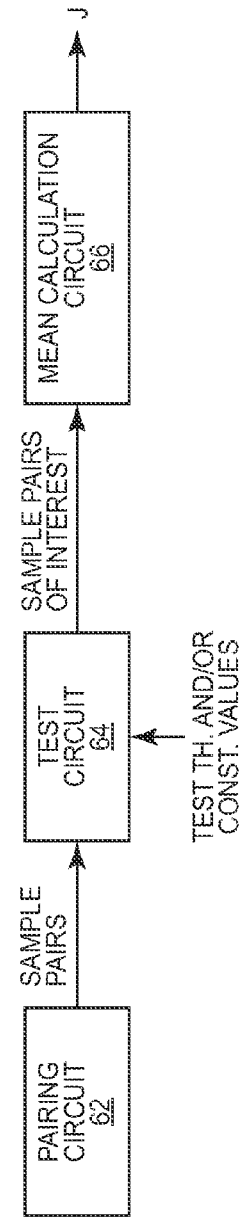

In turn, FIG. 4 illustrates an example arrangement for the interfering signal channel estimator 44B, which may be understood to be a functional subpart of the earlier-introduced channel estimator 44, which may be implemented in a DSP or other digital processing circuit. In any case, one sees a pairing circuit 62 that is configured to form pairs of received signal sample values. Such pairings represent, for example, some or all of the possible pairings of sample values currently held in the sample buffer 60 of FIG. 3.

Further, a test circuit 64 is configured to evaluate the sample pairs, to identify the samples pairs of interest. One or more of the identified sample pairs of interest—i.e., those pairs that are useful in estimating the interfering signal channel—are provided to a mean calculation circuit 66, which calculates the interfering signal channel estimate J as the average of a selected one of the pairs of interest, or as the average of the phase-aligned averages of two or more such pairs.

In more detail, the receiver processing circuits 40 (e.g., the demodulator 42) are configured to identify pairs of the sample values that are of interest for use in HB JD. These interesting pairs are referred to as "sample pairs of interest," and they are interesting because they represent sample values of the received signal in which the interfering signal component is the same. More particularly, the sample pairs of interest are those in which the interfering signal component is the same (e.g., the same interfering symbol value received under the same channel conditions), and particularly those in which the interfering signal component can be easily isolated.

As will be shown, the sample pairs of interest may be taken as those sample values that: (1) in an IQ diagram of the applicable modulation constellation points, occupy "mirror" positions taken diagonally across the [0,0] origin; and (2) are each interfered with by the same interfering symbol value. To detect interfering symbol values as being the "same" between sample pairs, it will be understood that the same interfering symbol value will have been transmitted for both samples in the pair and that substantially the same interfering signal channel conditions apply to both samples. Sample values that fit this description are also referred to herein as "complementary sample values," or "complementary pairs." Note that the real (Re) and imaginary (Im) components of the sample values in a complementary pair have opposite signs—i.e., a complementary pair=$u_1$, $-u_1$.

Take QPSK as an example. That modulation format defines four modulation constellation points on the Real (Re) and Imaginary (Im) axes, including: [1+i], [1−i], [−1+i], and [−1, −i]. Assume that one sample value of the received composite signal, denoted as y(m), corresponds to the desired signal symbol value of [1, i]. The complementary symbol value is thus [−1, −i], which corresponds to a diagonally "opposite" constellation position, as taken across the [0, 0] origin of the QPSK constellation.

In at least one embodiment, the channel estimator 44 is configured to identify the sample pairs of interest by, for each sample pair considered, calculating a normalized difference between the sample values comprising the pair, and deeming the sample pair to be of interest if the normalized difference lies within a threshold distance of a defined modulation constellation point. Such processing may be implemented in, for example, the processing circuitry illustrated in FIG. 4.

In the same or another embodiment, the receiver of the apparatus 30 comprises a diversity receiver, and the simplified JD method includes obtaining sample values for each diversity branch of the wireless communication receiver, forming sample pairs for each diversity branch, identifying sample pairs of interest for each branch, and calculating the interfering signal channel estimate per diversity branch.

Figure 5:
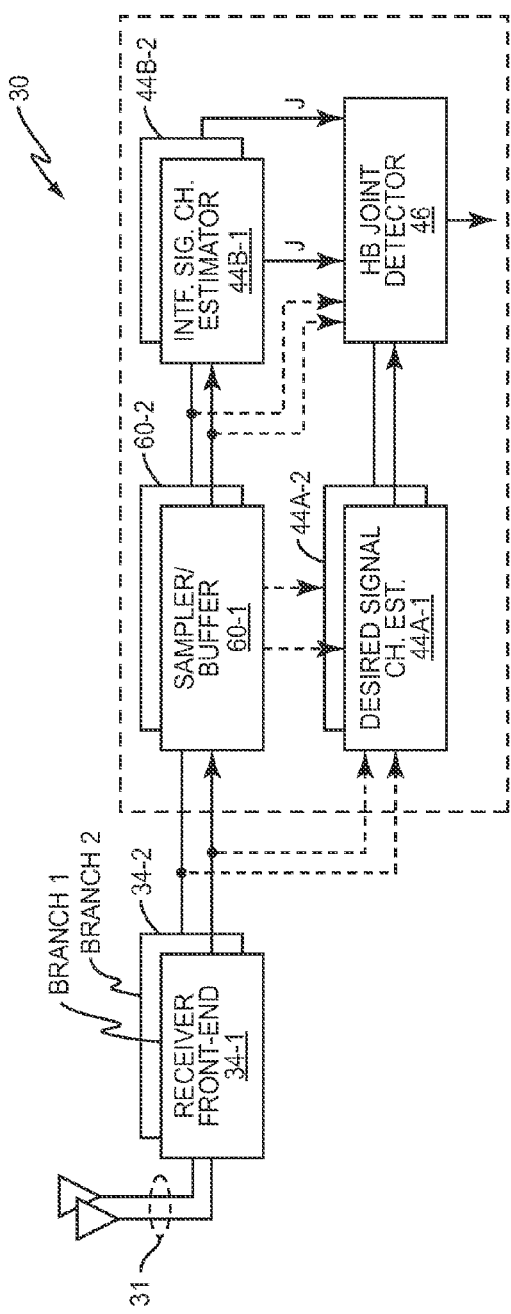
FIG. 5 is a block diagram of one embodiment of a wireless communication apparatus configured for diversity-reception processing.

FIG. 5 illustrates an example diversity receiver configuration for the apparatus 30 (although for simplicity, not all of apparatus 30 is illustrated). From the illustration, one sees two RX antennas 31, two receiver front-ends 34-1 and 34-2, along with two sample buffers 60-1 and 60-2. This arrangement, which may comprise physically or logically separate processing circuitry, or a mix thereof, provides distinct sets of sample values for the received composite signal as received on each RX antenna.

Thus, the desired and interfering signal channel estimators 44A-1/2 and 44B-1/2 can estimate antenna-specific channel estimators for the desired and interfering signals. Here, it will be understood that the interfering signal channel estimators 44B-1 and 44B-2 do not operate as conventional, pilot-based channel estimators but, rather, according to the pair-wise processing taught herein, with each such channel estimator processing the sample values corresponding to a respective one of the RX antennas 31.

In the same or another embodiment, the apparatus 30 is configured to detect desired signal symbols using a selected one of two or more symbol detection algorithms, including a first symbol detection algorithm that performs joint detection with said joint detector in functional dependence on the interfering signal channel estimate, and a second symbol detection algorithm that does not, and wherein the wireless communication apparatus further includes a controller configured to dynamically switch between operating with the first symbol detection algorithm and operating with a remaining one of the symbol detection algorithms in dependence on the strength of the interfering signal.

Figure 6:
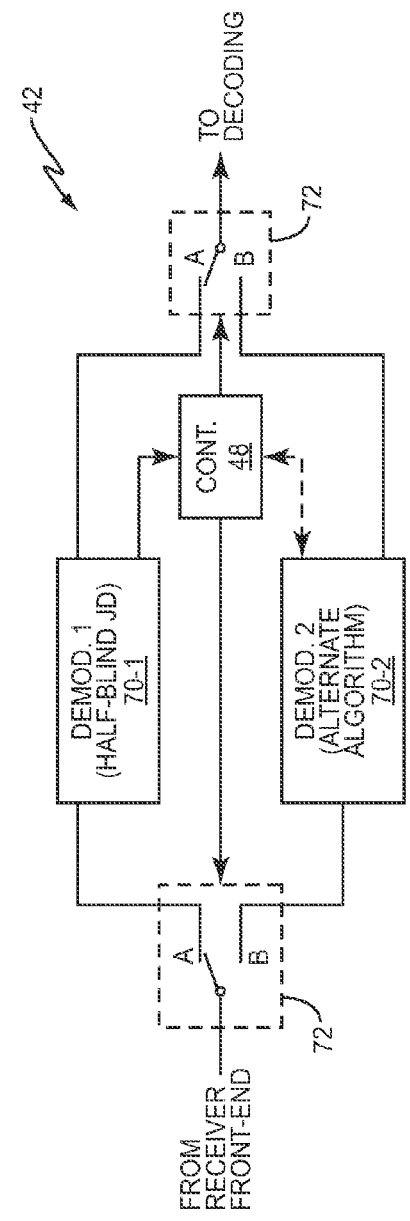
FIG. 6 is a block diagram of one embodiment of demodulation circuit for use in a wireless communication apparatus, where the demodulation circuit is configured to dynamically select (activate) one of two or more symbol detection algorithms.

FIG. 6 partially illustrates an example arrangement of the demodulator 42 for an embodiment where the apparatus 30 implements more than one symbol detection algorithm and dynamically chooses which algorithm to use for recovering the desired signal symbols from the received composite signal. As noted, the dynamic selection of which algorithm to use may be based on, for example, some measure (direct or indirect) of the signal strength of the interfering signal. As a general proposition, the HB JD processing proposed herein yields relatively better performance when the interfering signal is strong as compared to the desired signal, and potentially less good performance when the interfering and desired signals are comparable in strength. To be sure, however, HB JD processing can still be used under such conditions.

In the illustration, one sees a first demodulator 70-1, which is denoted as DEMOD. 1 and which implements HB JD processing as taught herein. Further, one sees a second demodulator 70-2, which is denoted as DEMOD. 2 and which implements an alternative symbol detection algorithm that is not HB JD. For example, DEMOD. 2 implements MMSE-based symbol detection.

The control circuit 48, or another controlling element within the apparatus 30, determines which symbol detection algorithm will be used at any given time, although the dynamic switching between algorithms may be constrained to prevent rapid back-and-forth switching. For example, if the (relative) strength of the interfering signal serves as the decision variable, the control circuit may switch from DEMOD. 2 (non-HB JD) to DEMOD. 1 (HB JD) upon detecting that the interfering signal is stronger than the desired signal by a first threshold, and then switch back to DEMOD. 2 at some later time, responsive to detecting that the interfering and desired signal strengths are within a second threshold. The second threshold may be made smaller than the first threshold to implement control hysteresis.

According to the diagram logic, the control circuit 48 picks one or the other demodulation algorithms by manipulating the "switches" 72—i.e., setting the switches 72 to the "A" position selects HB JD symbol detection (DEMOD. 1), while setting the switches to the "B" position selects non-HB JD symbol detection (DEMOD. 2). Those of ordinary skill in the art will recognize that the switches 72 may represent logical, conditional evaluation structures ("if-then-else") tests within a digital signal processing structure, rather than physical selection switches. Those of ordinary skill in the art will also appreciate that DEMOD. 1 and DEMOD. 2 may share some or all of the same underlying digital signal processing circuitry, where such circuitry is configurable on the fly, and can be repurposed to carry out one algorithm or the other, subject to the control determinations of the control circuit 48.

Further, as an implicit mechanism for testing whether the relative signal strength of the interfering signal favors use of HB JD processing, the control circuit 48 (or another entity within the apparatus 30) can evaluate the performance of non-HB JD symbol detection, and dynamically switch to HB JD processing upon detecting a performance shortfall for the non-HB JD processing. That is, DEMOD. 2 may be a computationally simpler algorithm than HB JD (although HB JD itself is much simpler than conventional JD), and may therefore be preferred unless demodulation/decoding performance targets cannot be achieved with DEMOD. 2.

For example, the receiver processing circuits 40 are configured to demodulate/decode the desired signal using Minimum Mean Square Error (MMSE) processing as DEMOD. 2 during times when HB JD processing is not selected for use. The receiver processing circuits 40 would then switchover to HB JD processing (DEMOD. 1) on a selective basis, such as responsive to detecting that the simpler symbol detection algorithm being carried out by the receiver processing circuits 40 is not meeting a minimum reception performance requirement.

Turning to more specific details in one or more embodiments, assume the received composite signal is an OFDM signal. Thus, the received composite signal at time k and subcarrier l may be written as $$y(k,l)=h_1 u_1(k,l)+h_2 u_2(k,l)+e(k,l), \quad \text{(Eq. 1)}$$

where $h_1$ and $u_1$ are the channel and data from the cell 14 of interest (i.e., the desired signal channel and the desired signal), and where $h_2$ and $u_2$ are the channel and data from the interfering cell 14. The remaining disturbances are modeled as white noise e(k,l).

As an example, the apparatus 30 estimates the desired signal channel $h_1$ using conventional techniques that are based on receiving pilot or other reference signals over the desired signal channel $h_1$. However, the interfering signal channel $h_2$ is unknown in both amplitude and phase, but will be approximately constant over a certain time related to the mobility of the apparatus 30, and for a certain number of subcarriers, depending on the delay spread of the interfering signal channel. As such, the simplified JD processing proposed herein provides particularly good performance for low speeds and lightly dispersive channels.

Further, the proposed simplified JD processing provides good performance for relatively small sets of received symbols. In particular, good simulation results have been obtained using from 10 to 100 symbols (for formation of the sample pairs of interest). As an example, note that one resource block (RB) in LTE contains 1 ms of data and 12 subcarriers, equating to 168 symbols.

Without restriction (using the receiver's explicit estimate of $h_1$), the received data may be transformed such that $h_1=1$ is achieved. That simplifying data transformation is assumed in the following discussion, to reduce the notational complexity used in the example equations. Additionally, the indexing is changed from (k,l) to n, because the location in time and frequency is not relevant to the following analyses. Hence the model according to these simplifications for the received composite signal is given as $$y(n)=u_1(n)+h_2 u_2(n)+e(n), \quad \text{(Eq. 2)}$$

where $h_2$ is an unknown complex value and $u_1$ and $u_2$ are unknown QPSK symbols, i.e., taken from the set $\{[1+i], [1-i], [-1+i], [-1-i]\}$, and where n=1, ..., N, with N being the number of available symbols over which the interfering and desired signal channels are assumed to be constant. It should be understood that the receiver processing circuits 40, as depicted in the example of FIG. 2, therefore can be understood as receiving one or more streams of digital sample values from the receiver front-end 34, where those digital samples represent y(n), as given in (Eq. 2).

The problem is now to determine (soft) values for the transmitted $u_1$. As a point of advantageous simplification, the soft values of $u_2$ are not needed, although the complex number $h_2$ is unknown. That is, the simplified JD processing contemplated herein works from observations of the $h_2 u_2$ product, rather than relying on an explicit, pilot-based estimate of $h_2$. For the QPSK case, the value of $h_2$ is determined as modulo rotations of 90 degrees. That is, the value of the interfering data symbol $u_2$ is not estimated by itself, but is known to have one of four possible phase rotations, as defined from the QPSK modulation constellation.

The above processing may be implemented via appropriate hardware and/or software-based configuration of the receiver processing circuits 40, within the apparatus 30. For example, the demodulator 42 depicted in FIG. 2 includes a channel estimator 44 that is configured to estimate the interfering signal channel estimate $h_2$ according to the following algorithm:

A. Form Sample Pairs. For a set of sample values of the received composite signal, form samples pairs, which can be expressed as (y(m),y(n)), where "m" and "n" simply denote different sample values taken from the set. (Note that the "set" of sample values generally comprises some or all of the received signal samples obtained over a given set of time and/or frequency resources of the received signal.)

B. Compute Normalized Differences. For at least some of the sample pairs, compute a normalized difference value, denoted as $\Delta$, where $$\Delta = \frac{(y(m) - y(n))}{2}. \quad \text{(Eq. 3)}$$

Note that difference values may be formed for some or all of the possible pairings of the sample values.

Figure 7:
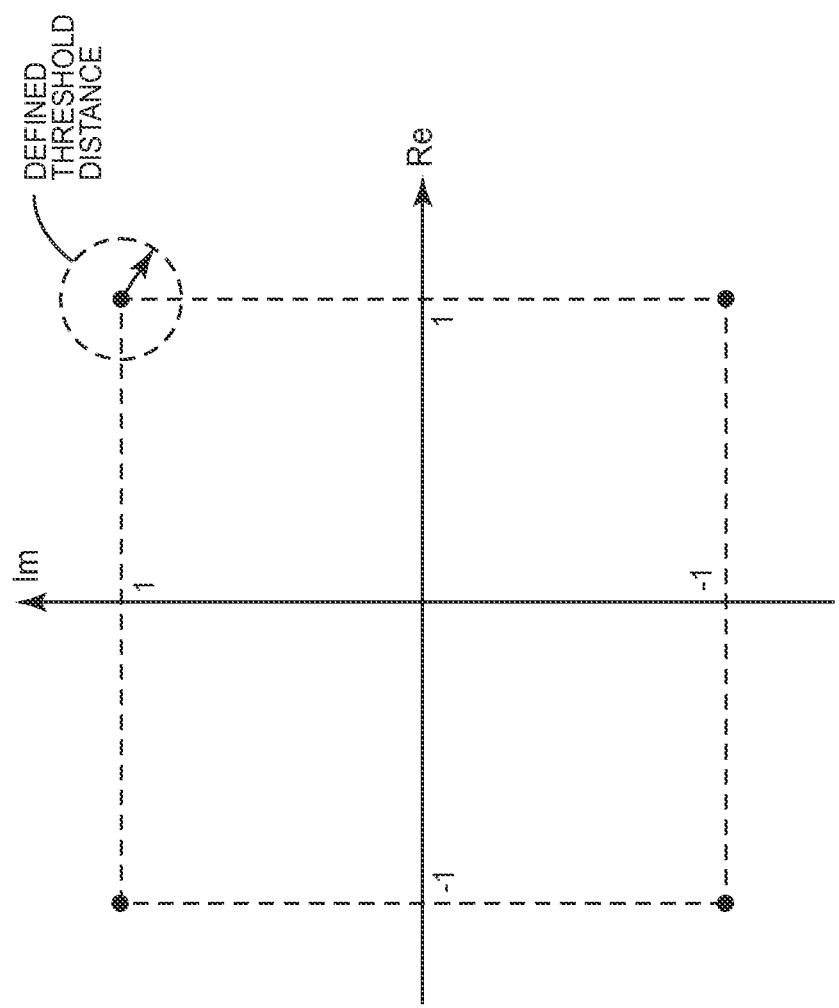
FIG. 7 is a diagram of one embodiment of a distance-based test in a modulation constellation used herein to evaluate received signal sample pairs of interest.

C. Identify Pairs of Interest. Evaluate whether a given pair of sample values represents a pair of interest (with respect to estimating the interfering signal channel $h_2$). In this regard, the receiver is looking for pairs of received signal sample values in which the interfering signal component is the same, and where the desired signal component can be removed or otherwise separated from the $h_2u_2$ product, using computationally simple subtraction and/or addition. An example approach uses distance testing. That is, the sample pair is of interest if:

$$(|Re\Delta|-1)^2+(|Im\Delta|-1)^2<\text{threshold}_{DIST}, \quad \text{(Eq. 4)}$$

where threshold$_{DIST}$ represents a defined distance value used to test whether the normalized difference calculated for the sample pair falls within a threshold distance around a defined modulation constellation point. See FIG. 7 which provides a QPSK example where a sample pair of interest is, for example, the pairing [y(m)=(1+i),y(n)=(−1−i)]. If one assumes that the transmitted $u_2$ is identical for y(m) and y(n), and one further assumes that $h_2$ is the same within some small range of variation for y(m) and y(n), then it is clear that the normalized difference computation removes the $h_2u_2$ component, and leaves (1+1+i+i)/2, which equals (1+i).

D. Determine the Interfering Signal Channel Estimate. In a simple, but potentially noisy approach, the interfering signal channel estimate is computed as the average value for the sample values comprising a selected sample pair of interest. For example, a given sample pair of interest includes the two values $y_1(n)$ and $y_2(n)$, and the interfering signal channel estimate is computed as $(y_1(n)+y_2(n))/2$. In a slightly more complex, but likely better performing approach, the interfering signal channel estimate is computed as the average of the useful pair averages. For each useful pair i, take the average J(i) as $$\begin{aligned} J(i) &= J[\text{pair } m, n] \\ &= (y(m) + y(n))/2 \\ &= h_2u_2(m) + (e(m) + e(n))/2. \end{aligned} \quad \text{(Eq. 5)}$$

For different values of i, $h_2$ is essentially constant, but $u_2(m)$ is still not determined. That is, the J(i) values will approximately be the same, but with random $k\cdot\pi/2$ uncertainty because the processing thus far has operated with the product $h_2u_2$. To take a coherent average of the different J(i), the processing taught herein aligns all values close to each other by adding one of the rotations $\phi(i)=0, \pi/2, \pi, 3\pi/2$. (These rotations relate to the example QPSK assumption, but other rotations may be used as appropriate for other assumed modulation formats.) Thus, the processing computes $J(i)\cdot\exp(j*\phi(i))$, which can for example be done by selecting the J(i) of the first pair as reference and aligning the rest to this one. (This may be done in different ways, e.g., selecting the $\phi(i)$ values that minimize the angular spread.) When all J(i) values are phase aligned, take the average of the phase-aligned averages as $$J = \left(\sum_i J(i)\varphi(i)\right) / (\text{\# useful pairs}). \quad \text{(Eq. 6)}$$

J is now an estimate of $h_2$, but still with the phase uncertainty of $k\cdot\pi/2$, due to the choice of reference in the alignment above.

E. Perform Joint Detection in Dependence on the Interfering Signal Channel Estimate J. The above J estimate is used to detect a desired set of $u_1$ symbols. This set may be larger than the set used for finding the interesting (useful) pairs of received signal sample values. For each $u_1$ symbol s, perform joint detection of $u_1$ and $u_2$ by checking all possible combinations of transmitted signal $u_1$ and $h_2$ phase values and picking the one combination that best matches the observed signal y(s). For QPSK, this approach gives 4·4=16 combinations to check. In more detail, an example joint detection of the desired symbol estimate $\hat{u}_1$ is given as $$\hat{u}_1(s) = \underset{u1(s)=const.\ \text{points}}{\operatorname{argmin}} \underset{k=0...3.}{\min}|y(s)-u_1(s)-J\cdot\exp(j\pi/2\cdot k)| \quad \text{(Eq. 7)}$$

Figure 8:
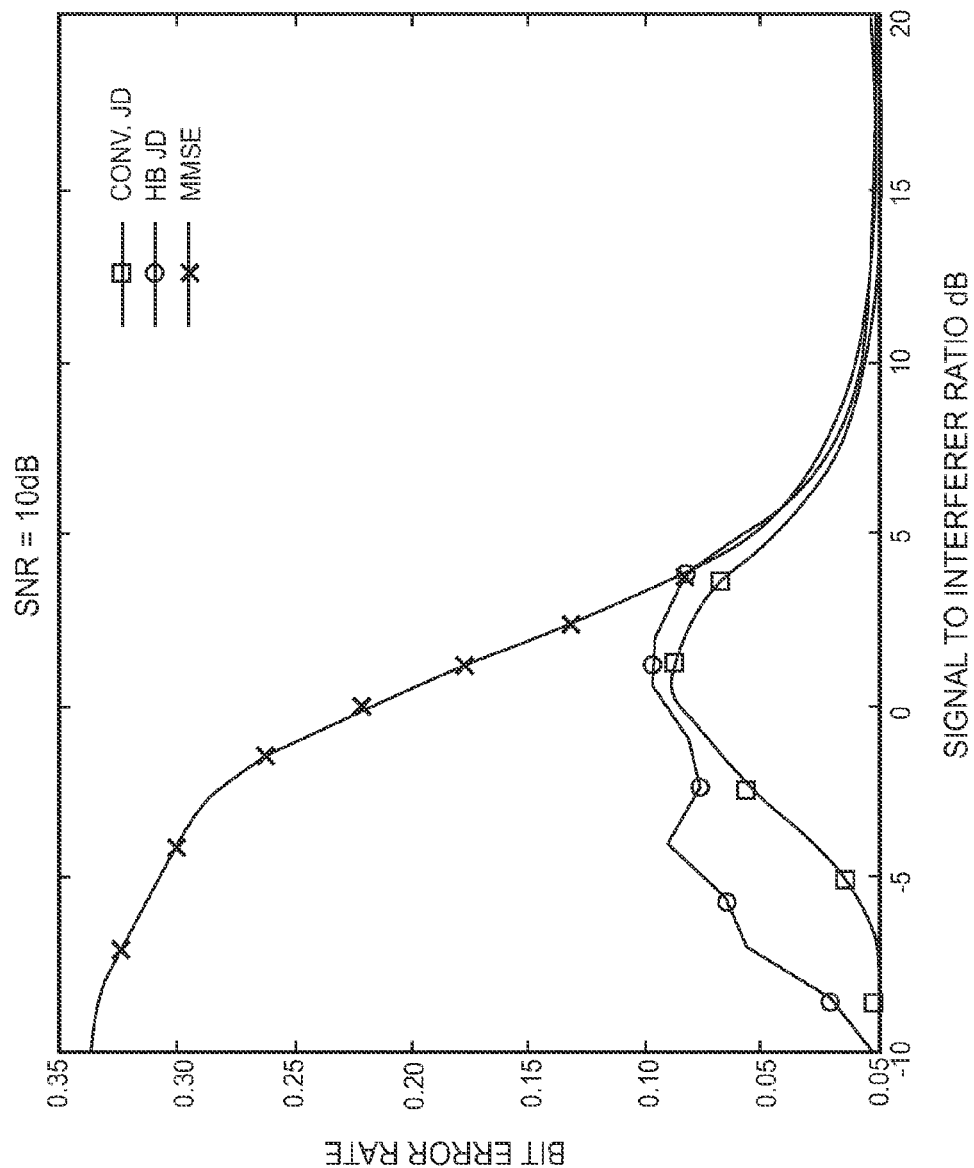
FIG. 8 is a diagram of reception performance for one embodiment of half-blind (HB) joint detection (HB JD) as taught herein, shown in relation to conventional, full-complexity JD processing, and Minimum Mean Square Error (MMSE) processing.

As previously noted, the above simplified JD processing algorithm (Steps A-E) offers performance approaching that of "optimal" or "full" joint detection, where the interfering signal channel estimate $h_2$ is known explicitly. For example, FIG. 8 provides the results of receiver performance in terms of bit error rate for an assumed received signal SNR of 10 dB, and for the case where 100 data points were used for processing. In particular, FIG. 8 plots a non-JD technique, such as MMSE, along with optimal (traditional) JD and the simplified HB JD proposed herein.

FIG. 9 presents the above algorithm as a method 900 which is implemented in the receiver processing circuits 40 of the apparatus 30, for example. According to the illustrated method 900, a receiver receives a composite signal and obtains sample values therefrom (Block 902). It will be understood that at least some of these sample values include both desired signal and interfering signal components. It will further be understood that at least some sample values contain the same interfering signal value (e.g., the same interfering symbol was transmitted), and that for at least some of these sample values, the interfering signal channel was the same.

The method 900 exploits the above circumstances to generate the interfering signal channel estimate (Block 904), using a greatly simplified processing approach that identifies pairs of sample values that are of interest (with respect to estimating the interfering signal channel), and processes those pairs of samples according to the earlier-described pattern processing. With the interfering signal channel estimate thus obtained (subject to some phase uncertainty), the method 900 further includes detecting desired signal symbols in a JD process that functionally depends on the interfering signal channel estimate (Block 906).

FIG. 10 illustrates another method 1000, which may be understood as a more generalized example of the method 900, with a particular broadening related to multi-antenna processing at the receiver. The diagram thus emphasizes the point that the teachings presented herein apply directly to receiver diversity processing using two or more RX antennas. For the example case of two receiver antennas, $y_1$, $h_1$, $h_2$ and e are 2×1 column vectors. Each RX antenna provides a stream of received composite signal samples, and to obtain the normalized signals, ZF (Zero-Forcing) equalization can be done on the two streams separately, using the respective elements in the $h_1$ vector. Then the correct scaling is achieved, and the signal sample pairs can be computed for each stream (Block 1002).

Processing continues with finding pairs of interest from either or both RX streams (Block 1004). Note that the algorithm can run as long as at least one pair of interest is found on either stream, and note that the phase angles are adjusted as before, individually for the two streams. The found pair(s) are used to estimate the (normalized) interfering signal channel estimate $h_2$ for each antenna (Block 1006) and HB JD is performed in functional dependence on that estimate (Block 1008).

For the QPSK example case, there are four possible points for each stream with respect to the desired symbol received on a given subcarrier. Joint detection may therefore be performed by choosing as a hard decision for the desired symbol $\hat{u}_1$ the point (now out of 8 for the two-antenna case, instead of 4 for the one-antenna case) that is closest to a QPSK point. Alternatively, rather than making a hard decision, the receiver processing circuits 40 may use soft values (soft bits), which may be computed by evaluating the metric of Equation 7 for all combinations and using the metric values via, for example, the log-max principle, which is well known in the art. In this regard, it will be understood that such soft-values can be used in the single-receiver (non-diversity) case, as well.

Note that the (dominant) interfering signal may be different on different receiver antennas, so the phase rotations/alignments used in the above algorithm may not be the same for each antenna-specific stream of received signal sample values. Also, as indicated before, the use of simplified HB JD processing may be made conditional, based on reception conditions. As one non-limiting example, the receiver processing circuits 40 of the apparatus 30 monitor the interfering signal channel estimates to detect times during which the interfering signal(s) are of low strength. Other symbol detection algorithms, such as MMSE or ZF, may offer better performance than HB JD processing during times when the interfering signal(s) are weak, and the receiver processing circuits 40 may therefore dynamically enable or disable one algorithm or another. For example, HB JD processing is used if a metric (such as $h_2$ estimates) indicates that the interfering signal is relatively strong, and non-HB-JD processing (such as MMSE) is used if the interfering signal is relatively weak. The basis for dynamically switching between the HB JD algorithm presented herein and a non-HB-JD algorithm is suggested by the diagrams presented in FIGS. 11 and 12.

Figure 11:
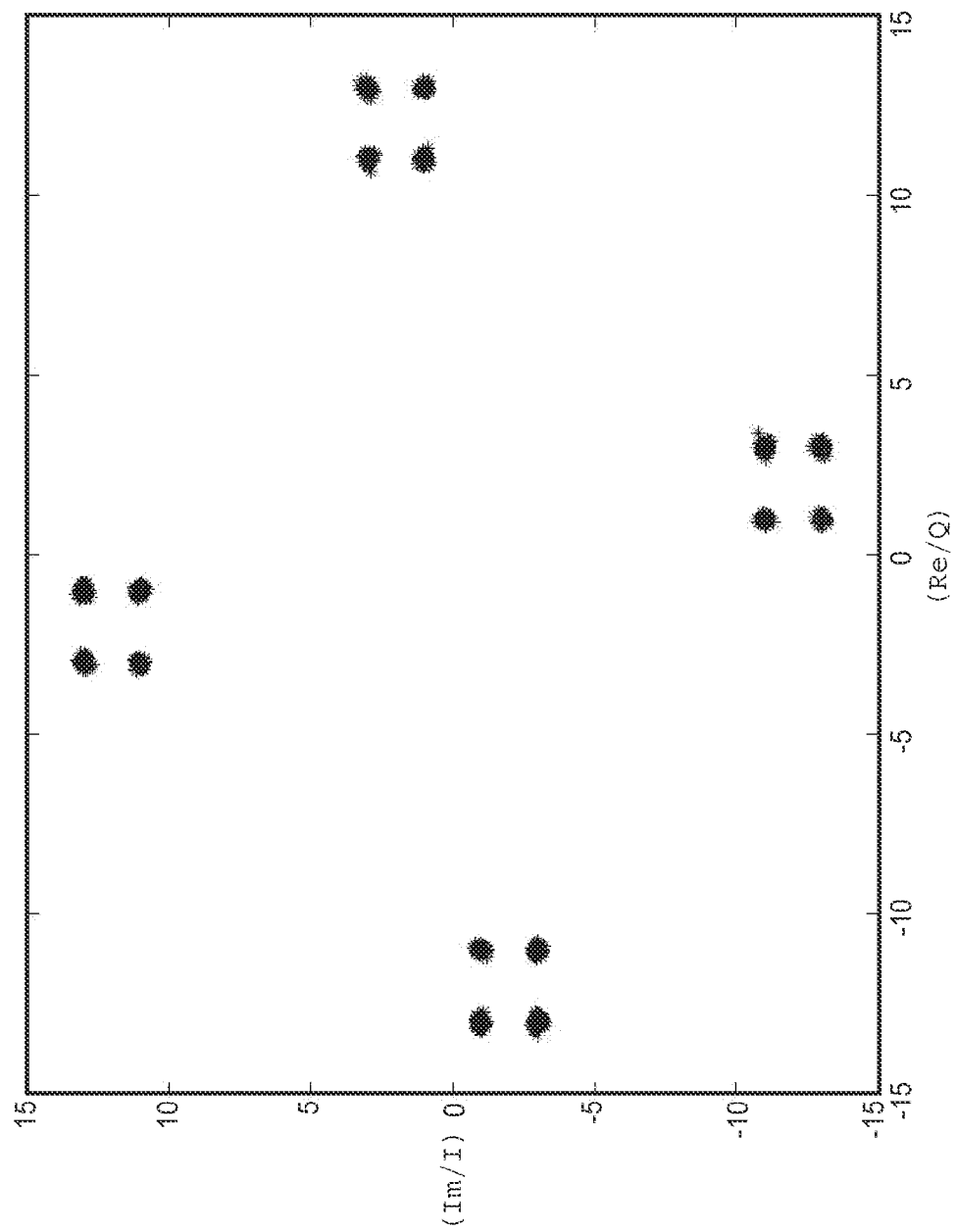
FIGS. 11 and 12 are IQ plots of typical received QPSK symbol values for a relatively strong interfering signal component (FIG. 11) and for a relatively weak interfering signal component (FIG. 12).
Figure 12:
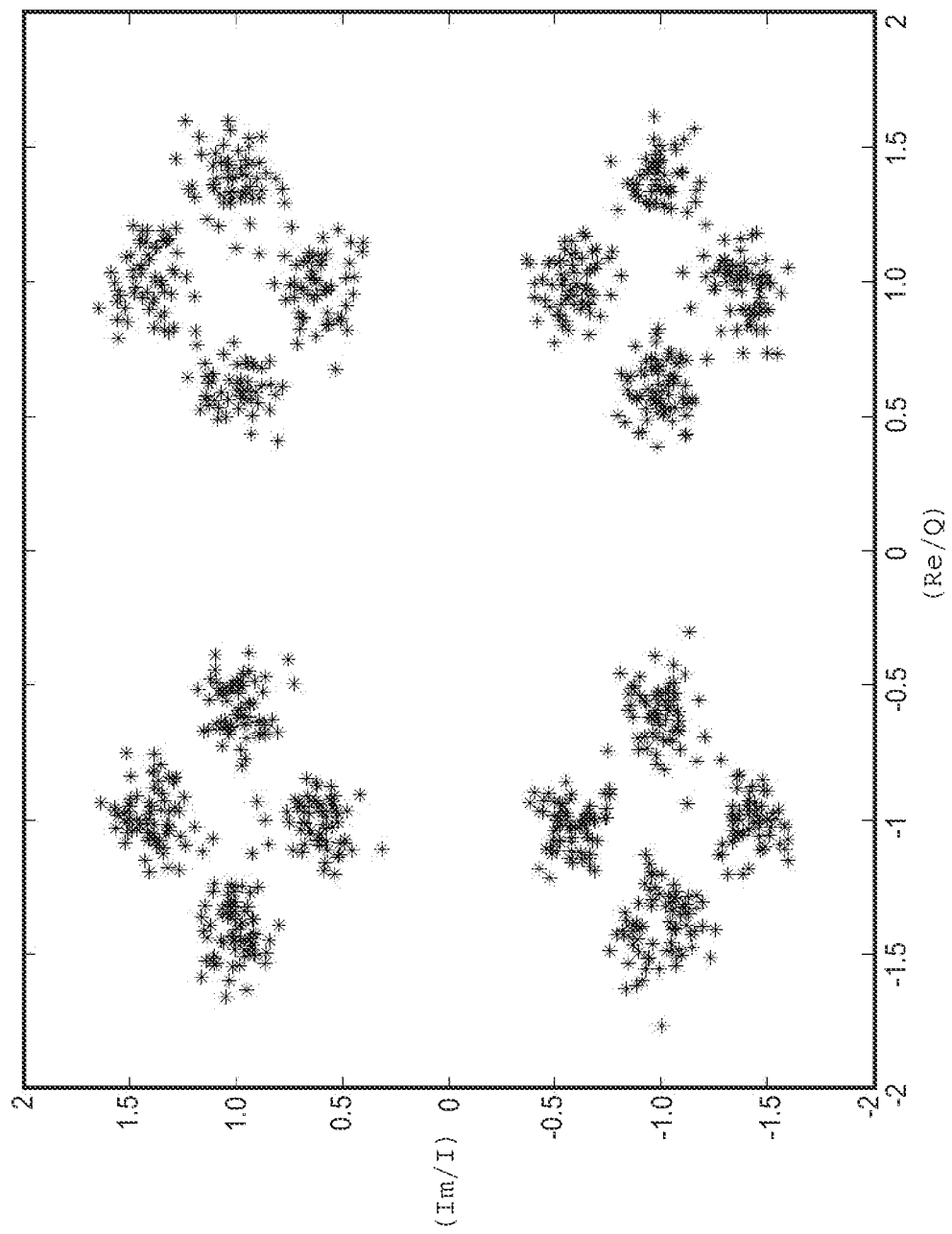

In FIG. 11, one sees the relatively well defined displacements of the desired signal component of the received signal in the presence of a strong interfering signal. In FIG. 12, one sees that the noise is on par with the interference, while both of them are weaker than the desired signal. With reference back to FIG. 6, in one or more embodiments, the control circuit 48 or another processing element of the apparatus 30 is configured to dynamically switch the operation of the demodulator 42 from HB JD processing to non-HB JD processing, in dependence on directly or indirectly evaluating interfering signal strengths, such that HB JD processing would be used, for example, in the case represented by FIG. 11 and would not be used in the case represented by FIG. 12. For the example scenario of FIG. 8, an SIR of 3-4 dB may be a good "switching" point. As a general proposition, the teachings herein are most advantageous for higher SNR. Even so, such teachings can provide performance advantages at very low SIRs in comparison to MMSE processing, for example.

In any case, it will be appreciated that not all embodiments of the contemplated apparatus 30 dynamically switch between HB JD processing and another symbol detection algorithm, as the performance penalty appears to be small for using HB JD during times when the desired and interfering signals are of comparable strength. Dynamic switching is therefore to be understood as an advantageous but non-limiting example embodiment of the present invention.

Further, several of the preceding examples and their associated signal processing assume that the desired and interfering signals are QPSK signals. For example, the preceding example equations for finding "pairs of interest" and for estimating the channel from the interfering signal were derived according to the QPSK assumptions.

However, it is contemplated herein to modify such algorithms if the desired signal is known to be 16QAM or higher. Such knowledge can be gained, for example, via certain control channel information. In such scenarios, a receiver still can be configured to find pairs where $u_1$ at sample no. 2 equals $-u_1$ at sample no. 1 by computing normalized differences according to Eq. (3), and by extending the processing associated with Eq. (4) to consider the greater number of alternatives associated with 16QAM (or higher). Likewise, the joint detection processing associated with Eq. (7) would be expanded to consider the greater number of possible combinations. Similarly, if the interfering signal is 16QAM or higher, $h_2 u_2$ would still be constant within a sample "pair of interest." However, because $u_2$ now has more possible amplitudes and phases, the estimation of J is expanded to account for the greater range of amplitudes and phases. Thus, the present invention offers advantageous simplicity in the QPSK case, as one example, but it directly applies to other modulation formats.

Another case where signal format assumptions may not be fulfilled is when $u_2$ is "0" for certain OFDM REs. (This circumstance arises, for example, when the interfering signal is transmitted discontinuously (DTX) and is thus silent (absent) for certain REs.) There may still be pairs of interest including such symbols, but the value of $h_2 u_2$+noise will be close to 0 for such pairs. Such pairs may be excluded from the channel estimation. Thus, in at least one embodiment herein, half-blind joint detection considers an additional possibility, i.e., the possibility that $u_2$=0. For the QPSK example, the combinations to evaluate would increase from 4*4 to 4*5.

With these variations and extensions in mind, those of ordinary skill in the art will appreciate that the present invention is not limited by the foregoing discussion of example embodiments. Instead, the present invention is limited only by the patent claims and their legal equivalents.

What is claimed is:

1. A method of detecting a desired signal within a composite signal that includes an interfering signal, said method performed in a wireless communication apparatus and comprising:

receiving the composite signal and obtaining sample values therefrom, where at least some of the sample values include a desired signal component and an interfering signal component;
generating an interfering signal channel estimate by:
forming sample pairs for some or all of the sample values;
identifying sample pairs of interest as those sample pairs in which the interfering signal component is the same, wherein identifying the sample pairs of interest comprises, for each sample pair considered, calculating a normalized difference between the sample values comprising the sample pair, and deeming the sample pair to be of interest when the normalized difference lies within a threshold distance of a defined modulation constellation point; and
calculating the interfering signal channel estimate as an average value determined from one or more of the sample pairs of interest; and
detecting desired signal symbols from the composite signal in a joint detection process that functionally depends on the interfering signal channel estimate.

2. The method of claim 1, wherein calculating the interfering signal channel estimate comprises one of:
calculating the interfering signal channel estimate as the average value of the signal samples in a selected sample pair of interest; or
calculating the average value for each sample pair of interest in a set that includes some or all of the sample pairs of interest, phase-aligning the average values, and calculating the interfering signal channel estimate as the average of the phase-aligned average values.

3. The method of claim 1, wherein detecting the desired signal symbols from the composite signal comprises taking sample values of the composite signal as received signal observations, and determining a best hypothesis for the desired signal symbol represented by each such observation based on determining a candidate symbol value for the desired signal symbol and a candidate phase value for the interfering signal channel estimate that best accounts for the received signal observation.

4. The method of claim 1, wherein the sample values correspond to desired signal symbols received within a certain span of time or frequency, or both.

5. The method of claim 4, wherein the composite signal comprises an Orthogonal Frequency Division Multiplex (OFDM) signal, and wherein the sample values comprise symbol samples taken at given symbol times for given subcarriers.

6. The method of claim 1, wherein the wireless communication apparatus includes a diversity receiver and wherein the method includes obtaining sample values for each diversity branch of the diversity receiver, forming sample pairs for each diversity branch, identifying sample pairs of interest for each branch, and calculating the interfering signal channel estimate per diversity branch.

7. The method of claim 1, wherein the method is a first one of two or more symbol detection algorithms that the wireless communication receiver is configured to perform, and the method further comprising dynamically selecting the first symbol detection algorithm or another one of the two or more symbol detection algorithms for recovering symbols from the desired signal in dependence on the strength of the interfering signal.

8. A wireless communication apparatus configured to detect a desired signal within a composite signal that includes an interfering signal, said wireless communication apparatus comprising:
a receiver configured to receive the composite signal and obtain sample values therefrom, where at least some of the sample values include a desired signal component and an interfering signal component;
a channel estimator configured to generate an interfering signal channel estimate based on the sample values, the channel estimator being configured to:
form sample pairs for some or all of the sample values;
identify sample pairs of interest as those sample pairs in which the interfering signal component is the same, wherein the channel estimator is further configured to identify the sample pairs of interest by, for each sample pair considered, calculating a normalized difference between the sample values comprising the pair, and deeming the sample pair to be of interest when the normalized difference lies within a threshold distance of a defined modulation constellation point; and
calculate the interfering signal channel estimate as an average sample value computed from one or more of the sample pairs of interest; and
a joint detector configured to detect desired signal symbols from the composite signal in a joint detection process that functionally depends on the interfering signal channel estimate.

9. The wireless communication apparatus of claim 8, wherein the channel estimator is configured to do one of:
calculate the interfering signal channel estimate as the average value of the signal samples in a selected sample pair of interest; or
calculate the average value for each sample pair of interest in a set that includes some or all of the sample pairs of interest, phase-align the average values, and calculate the interfering signal channel estimate as the average of the phase-aligned average values.

10. The wireless communication apparatus of claim 8, wherein the joint detector is configured to detect the desired signal symbols from the composite signal by taking sample values of the composite signal as received signal observations, and determining a best hypothesis for the desired signal symbol represented by each such observation, based on determining a candidate symbol value for the desired signal symbol and a candidate phase value for the interfering signal channel estimate that best accounts for the received signal observation.

11. The wireless communication apparatus of claim 8, wherein the sample values correspond to desired signal symbols received within a certain span of time or frequency, or both.

12. The wireless communication apparatus of claim 11, wherein the composite signal comprises an Orthogonal Frequency Division Multiplex (OFDM) signal and the receiver comprises an OFDM receiver, and wherein the sample values comprise symbol samples taken at given symbol times for given subcarriers.

13. The wireless communication apparatus of claim 8, wherein the receiver comprises a diversity receiver configured to obtain sample values for each diversity branch of the wireless communication receiver, and wherein the channel estimator is further configured to form sample pairs for each diversity branch, identify sample pairs of interest for each branch, and calculate the interfering signal channel estimate per diversity branch.

14. The wireless communication apparatus of claim 8, wherein the wireless communication apparatus is configured to detect desired signal symbols using a selected one of two or more symbol detection algorithms, including a first symbol detection algorithm that performs joint detection with said joint detector in functional dependence on the interfering signal channel estimate, and a second symbol detection algorithm that does not, and wherein the wireless communication apparatus further includes a controller configured to dynamically switch between operating with the first symbol detection algorithm and operating with a remaining one of the symbol detection algorithms in dependence on the strength of the interfering signal.

\* \* \* \* \*

UNITED STATES PATENT AND TRADEMARK OFFICE
CERTIFICATE OF CORRECTION

PATENT NO. : 8,744,026 B2  
APPLICATION NO. : 12/903836  
DATED : June 3, 2014  
INVENTOR(S) : Rosenqvist et al.

Page 1 of 1

It is certified that error appears in the above-identified patent and that said Letters Patent is hereby corrected as shown below:

On the Title Page, in Item (73), under "Assignee", in Column 1, Line 1, delete "Telefonakktiebolaget" and insert -- Telefonaktiebolaget --, therefor.

Signed and Sealed this  
Tenth Day of February, 2015

Michelle K. Lee  
*Deputy Director of the United States Patent and Trademark Office*